United States Patent [19]

Fukumoto et al.

[11] 4,094,100
[45] June 13, 1978

[54] FREE MOVEMENT PREVENTING DEVICE FOR WINDOW GLASSES OF AUTOMOBILES

[75] Inventors: Ryoichi Fukumoto, Nagoya; Toshiro Igarashi, Hoi, both of Japan

[73] Assignee: Aisin Seiki Kabushiki Kaisha, Kariya, Japan

[21] Appl. No.: 709,599

[22] Filed: Jul. 29, 1976

[30] Foreign Application Priority Data

Jul. 29, 1975 Japan ........................ 50-105513[U]

[51] Int. Cl.² ............................................. E05F 11/38
[52] U.S. Cl. ..................................... 49/348; 49/377
[58] Field of Search ................. 49/348, 349, 350, 351, 49/352, 353, 374, 375, 227, 376, 377

[56] References Cited

U.S. PATENT DOCUMENTS

| | | | |
|---|---|---|---|
| 1,911,697 | 5/1933 | Levan | 49/377 |
| 2,565,232 | 8/1951 | Hezler, Jr. | 49/375 X |
| 3,273,285 | 9/1966 | Champion | 49/377 X |
| 3,591,983 | 7/1971 | Hanson | 49/350 X |
| 3,844,064 | 10/1974 | Yamaha et al. | 49/348 |
| 3,868,788 | 3/1975 | Podolan | 49/349 X |

*Primary Examiner*—Philip C. Kannan
*Attorney, Agent, or Firm*—Finnegan, Henderson, Farabow & Garrett

[57] ABSTRACT

In an automobile including a door panel having a window opening and a window glass mounted in the door panel for vertical movement. The window glass is provided at its lower portion with a support bracket carrying a guide follower which is in sliding engagement with a vertical guide rod. A window glass pressing device is secured to the door panel so as to engage the window glass whereby the inward deflection or displacement of the lower portion of the window glass may be prevented.

10 Claims, 8 Drawing Figures

FREE MOVEMENT PREVENTING DEVICE FOR WINDOW GLASSES OF AUTOMOBILES

This invention relates to a free movement preventing device for window glasses, and more particularly to a device for preventing the outward deflection of an upper edge of window glass for automotive vehicles.

Most automotive vehicles such as passenger cars are provided with window openings between a door and a roof panel. In order to provide a window well at the lower portion of the window opening, the outer peripheries of an inner panel and an outer panel are interconnected to each other. The window glass is adapted at its side edge to be properly seated against weather seal strips mounted on the peripheral edge of the window opening, thereby closing the door inside and the window opening due to the vertical sliding movement along the vertical track.

The proper location of the window glass with respect to the co-operating weather strips ensures the prevention of noise or water leakage into the vehicle which is possibly produced when the automobiles are running at a high speed with the window glasses closed. Such an objectionable noise experienced during high speed driving is caused by breakage of sealing engagements between the window glasses and the weather seal strips which breakage is in turn resulted from the outward deflection of the window glasses due to the laterally outwardly Acting suction pressure on the front edge thereof. Such deflection or displacement of the window glasses during the high speed driving will also result in the roof leaking through the defective sealing engagement when it rains.

In addition, it is significant in the art to minimize the influence of oscillation imparted on the window glass when the door is moved between the closed and the opened positions, because the shock upon the door movement may displace the window glass with respect to the window opening peripheral members thereby causing the sealing engagement to be defective.

Therefore, in order to ensure proper locations of the window glasses with respect to the weather sealing strips, adjustment devices have widely been employed in the window glass guide means so that the lateral positions of the upper edges of the window glasses can be adjusted as desired.

A conventional adjusting mechanism employed for this purpose comprises a window glass support bracket secured to the lower part of the window glass and carrying a guide follower which slidably engages a substantially vertically extending guide rod stationarily mounted in the car body or in the door panel as the case may be. A window driving or actuating mechanism is provided for moving the window glass in substantially vertical direction along the guide rod through manually operated mechanical means or electrically operated means. Usually, the guide follower includes a pair of extensions or flanges at the opposite sides thereof, each of the flanges being provided with an elongated slot for receiving a tightening bolt which serves to fasten the guide follower to the window glass support bracket. Thus, the guide follower is mounted on the window glass support bracket in such a manner that adjustment can be made in respect of the distance between the bracket or the window glass and the guide follower or the guide rod. Since the window glass is restrained from lateral movement at the lower edge of the window opening by means of the weather seal strip, the aforementioned adjustment of the support bracket causes a lateral swinging movement of the window glass about the seal strip. Therefore, the lateral position of the upper edge of the window glass can be adjusted as desired with respect to the upper weather seal strip through the aforementioned adjusting operation.

The conventional adjusting mechanism has been found disadvantageous, however, to get the desirable engagement between the window glass and the weather strips. One of the reasons is that the window glass is at its lower part held slidably relative to the guide rod by means of the follower and is to be held by the weather strips of the door, so that the trace of the window glass during the vertical movement thereof does not actually conform to the curvature of the window glass. Thus, if the distance between the follower at the lower part of the window glass and the guide rod is adjusted to thereby regulate the position of the upper edge of the window glass with respect to the weather strips, such adjustment is not normally effective at any positions of the window glass. In addition, the ratio of the distance between the weather strip of the door and the follower relative to the distance between the upper edge of the window glass and the weather strip of the door is considerably large when the window is closed. Accordingly, a slight suction pressure at the upper edge of the window glass may displace and rotate the lower edge thereof around the weather strips toward the inside of the vehicle, thereby resulting in the sealing leakage.

It is, therefore, an object of this invention to provide a free movement preventing device for window glasses of automotive vehicles which may avoid the outward deflection or displacement of upper edges of the window glasses.

Other objects and advantages of the invention will become apparent from the following description of embodiment with reference to the accompanying drawings in which.

Figure 1:
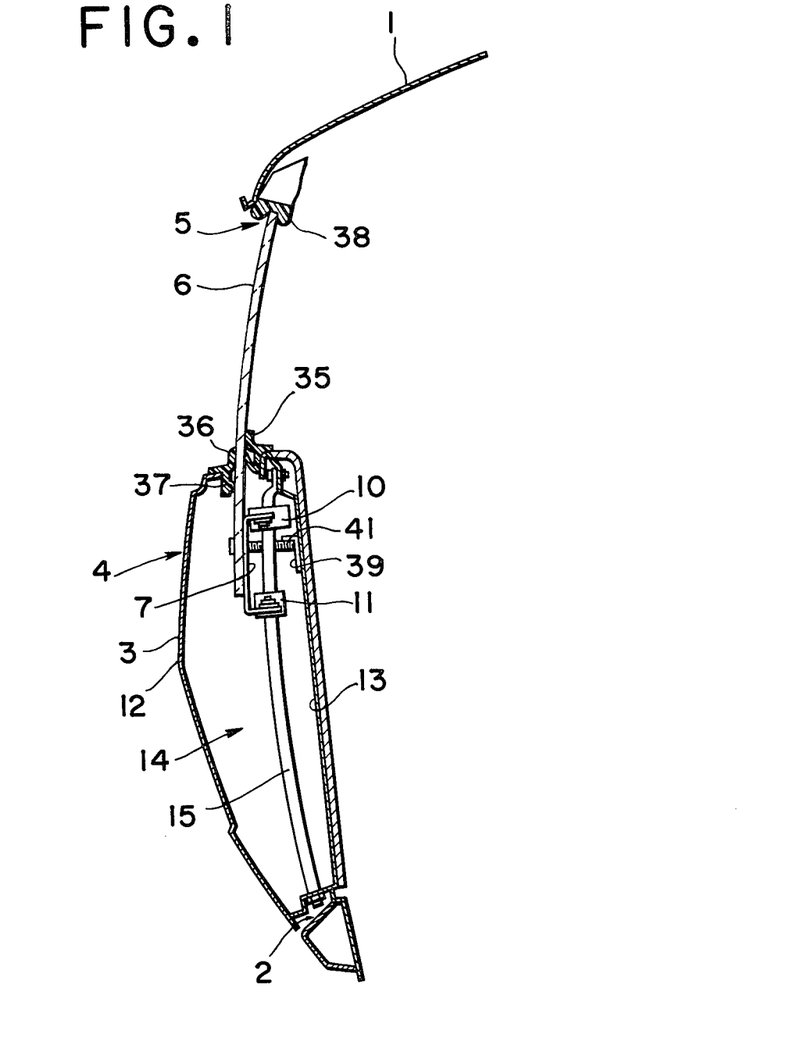
FIG. 1 is a sectional view fragmentarily showing a body of an automobile.

Referring now to the drawings, particularly to FIG. 1, there is fragmentarily shown a body 1 of an automobile which has a side opening 2 as is common in the art. The opening 2 of the car body is adapted to be closed by a door assembly 3 which comprises a door panel assembly 4 having a window opening 5 at the upper portion thereof. A window glass 6 is vertically slidably arranged in the door panel assembly 4 so that it closes the window opening 5 in its upper position.

In order to support the window glass 6 for vertical sliding movement between the upper closed position and the lower opened position, a guide follower support member or bracket 7 is secured to the lower portion of the window glass 6. The support bracket 7 is formed at its upper and lower edges with flanges 8 and 9 which respectively carry upper and lower guide followers 10 and 11.

Figure 3:
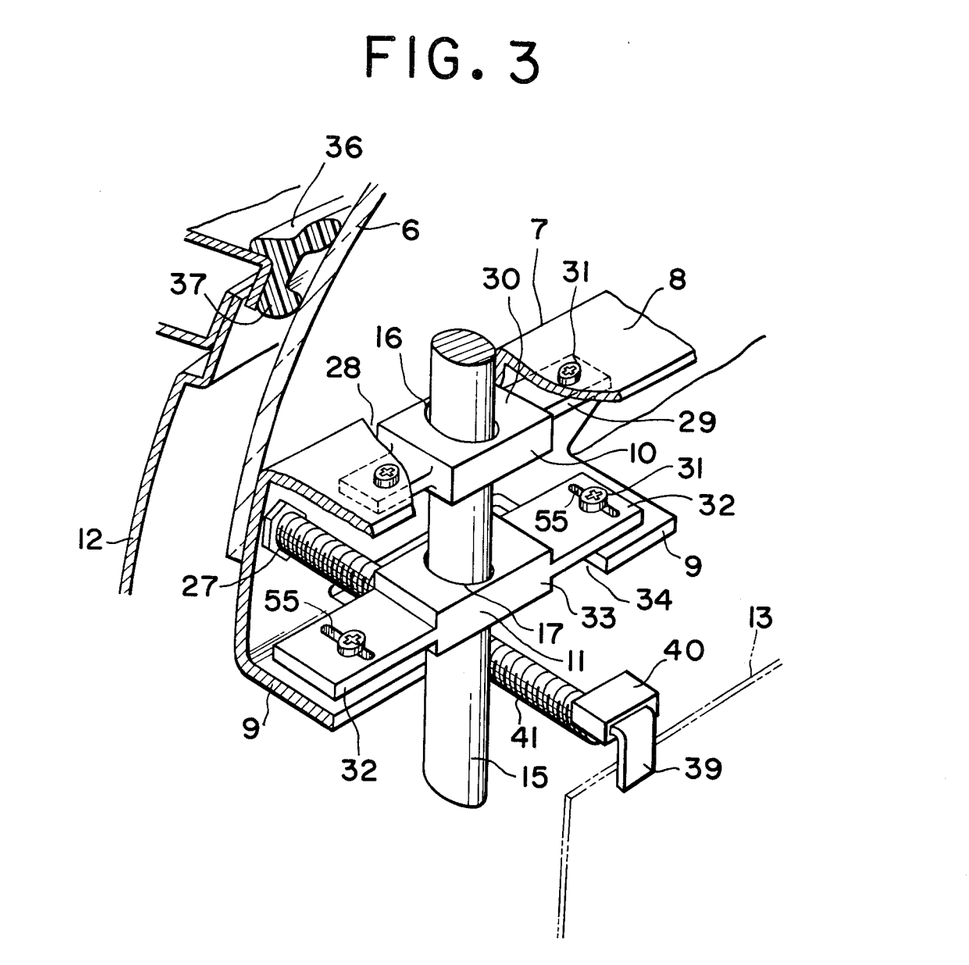
FIG. 3 is a fragmentary perspective view showing the relationship between the window glass and a guide rod therefor.

The door panel assembly 4 comprises an outer panel 12 and an inner panel 13 which are assembled together to provide a hollow space 14 therebetween. In the space 14 of the door panel assembly 4, there is disposed a guide rod 15 which extends substantially vertically and is secured to the inner panel 13 at the opposite ends thereof. Recommendably, the guide rod 15 has a curvature which substantially conforms to that of the window glass 6. The guide followers 10 and 11 have vertically aligned holes 16 and 17 which are adapted to slidably engage the guide rod 15 as shown in FIG. 3.

In order to drive the window glass 6 in the vertical direction, there is provided a window drive or actuating mechanism 18 which comprises an actuating arm 22 swingably mounted on the door panel assembly 4 by means of a pivot shaft 20 and having one end provided with a segmental gear 21. The door panel 4 is provided with a manually or electrically operated shaft 23 which carries a pinion gear (not shown) meshing with the segmental gear 21. The support bracket 7 is provided with a substantially horizontally extending rail member 24 of channel shaped cross-sectional configuration 26 which is engaged with a roller 25 carried by the free end of the arm 22. Thus, it will be understood that, as the shaft 23 is rotated, the rotation is transmitted through the pinion to the segmental gear 21. Therefore, the arm 22 is swung about the pivot shaft 20 and the swinging movement of the arm 22 is then converted at the rail 24 into a vertical movement of the member 7 and the window glass 6. Thus, the window glass 6 is caused to move vertically along the guide rod 15.

Figure 2:
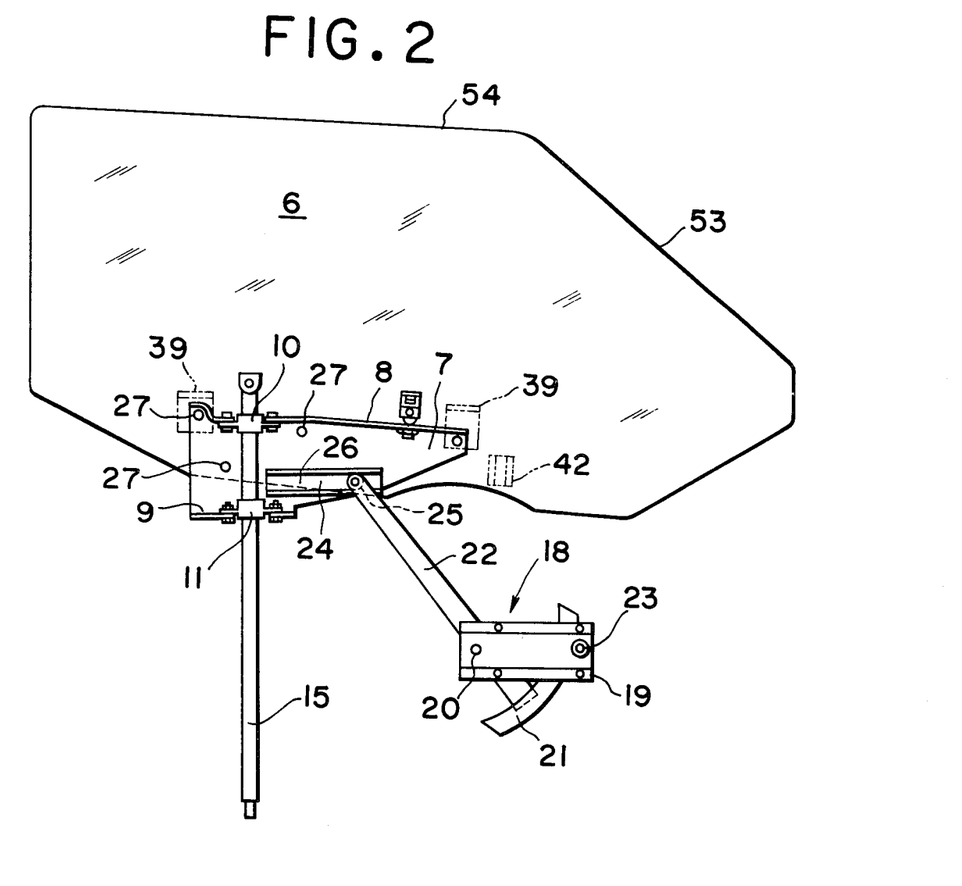
FIG. 2 is an elevational view showing a window glass mounting means for automobiles.

The window glass support bracket 7 is generally made of a metallic material and secured to the window glass 6 by means of screws 27. The upper and lower flanges 8 and 9 of the member 7 are formed by bending the corresponding edges of the bracket 7 inwardly. In order to accommodate the upper guide follower 10, the upper flange 8 is formed with a cutout 28. It is to be noted that the upper flange 8 may extend throughout the length of the upper edge of the bracket 7, but the length of the lower flange 9 must be so determined that it does not interfere with the operation of the window driving or actuating mechanism 18. In the preferred embodiment shown in the drawings, it will be seen that the bracket 7 is cutoff obliquely at the lower side as shown in FIG. 2 so as to avoid possible interference between the arm 22 and the lower flange 9. The upper and lower flanges 8 and 9 have the further effect of providing required stiffness or rigidity in the bracket 7.

The upper guide follower 10 is preferably made of a plastic material and comprises a body 30 having extensions 29 extending outwardly from the opposite edges thereof. The follower 10 is inserted into the cutout 28 formed in the upper flange 8 with the extensions 29 located beneath the flange 8. The follower 10 is thus secured to the flange 8 at the extensions 29 by means of bolts 31. The hole 16 for accommodating the guide rod 15 is formed in the body 30 of the follower 10.

The lower guide follower 11 is also preferably made of a plastic material and comprises a body 33 having extensions 32 which extend outwardly from the opposite edges thereof and are provided with an elongated hole 55. The follower 11 is inserted into a cutout 34 formed in the lower flange 9 with the extensions 32 located above the flange 9. The follower 11 is thus secured to the flange 9 at the extensions 32 by means of bolts 31. The hole 17 for accommodating the guide rod 15 is formed in the body 33 of the lower follower 11.

The hole 16 of the upper guide follower 10 is formed to be laterally elongated thereby permitting the inclination of the window glasses 6. The hole 17 of the lower guide follower 11 is preferably of a combined configuration of an outwardly enlarged frustroconical portion and a cylindrical shape portion therewithin. The cylindrical shape portion of the hole 17 is in contact with the rod 15 and the conical shape portion of the lower guide follower 11 may be in contact with the rod 15.

As shown in FIG. 1, the outer and inner panels 12 and 13 of the door panel assembly 4 are provided at their upper edges with weather strips 35 and 36. The outer weather strip 36 is provided at its lower portion with a hard projection 37 around which the window glass 6 may be rocked. At the upper periphery of window opening 5 of the vehicle body 1 is mounted an upper weather strip 38 against which the upper edge of the window glass 6 is forced into sealing engagement when it is in the closed position. In order to ensure that the upper edge of the window glass 6 is properly seated against the upper seal strip 38, adjustment is made in such a way that the attaching position of the lower guide follower 11 to the lower flange 9 of bracket 7 is regulated; that is, the relative distance of the lower edge of the window glass 6 and the rod 15 is regulated so as to rock the window glass 6 around the projection 37 of the outer weather strip 36.

The inner panel 13 is provided at its suitable portion with a stopper 39 which may define or limit the upper end position of the window glass 6. Although the stopper means may be served by the general or well known member, it is also possible to employ the stopper 39 having an outward extension 40 as shown in FIG. 3. According to such stopper means, the screw 27 for securing the window glass 6 to the bracket 7 is extended so that an extension 41 of the screw will be in contact with the extension 40 of the stopper 39 when the window glass 6 is moved up, thus limiting the further movement of the window glass 6. If the screw extension 41 is firmly engaged with the stopper extension 40 at this time, the lateral movement of the window glass is thus limited.

According to the invention, the window glass mounting means is further provided with a glass pressing device 42 which may prevent the upper portion of the window glass from being deflected outward of the vehicle.

Figure 4:
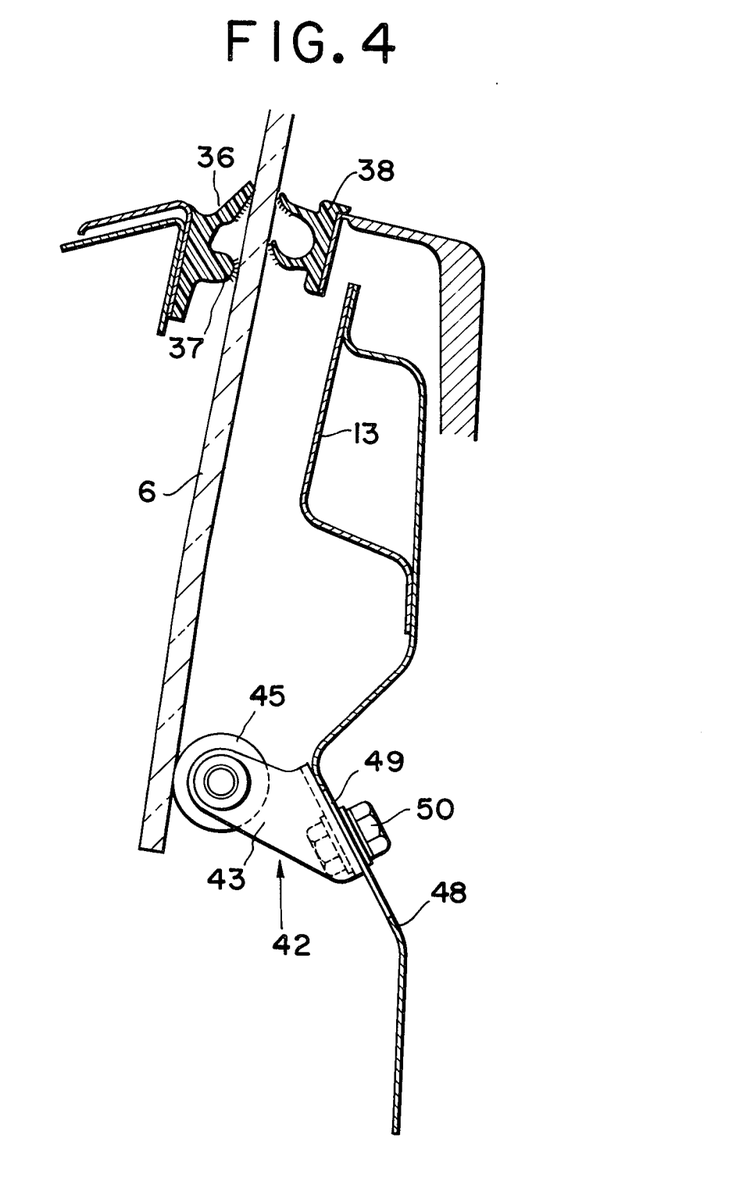
FIG. 4 is a sectional view illustrating one embodiment of a window glass pressing device.
Figure 5:
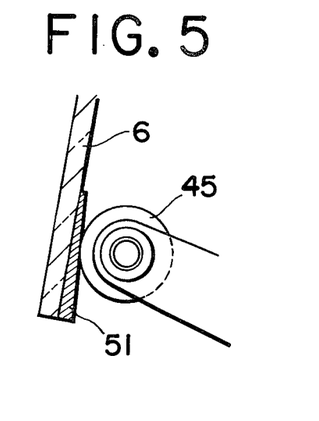
FIG. 5 is a sectional view fragmentary of another embodiment of the window glass pressing device.

The window pressing device 42 as illustrated in FIG. 4 includes a body 43 of channel shaped cross-sectional configuration and a roller 45 mounted between opposite side walls 44 of the body 43. The roller 45 is made of a plastic material or a hard rubber so as not to injure the window glass 6 while to retain some hardness, and is rotatable with respect to the body 43. A bottom wall 46 of the body 43 is provided with a bolt receiving hole 47. The device 42 is secured to an oblique side portion 48 of the inner panel 13 which is provided with an elongated hole 49. Through the holes 47 and 49 is passed a bolt 50 so as to secure the pressing device 42 to the inner panel 13. The position of the roller 45 may be regulated inwardly or outwardly if the pressing device 42 is so secured to the oblique side portion 48 of inner panel 13 that the attaching position thereof may be regulated along the oblique side portion 48. The adjustment of the lower flange 9 to the lower guide follower 11 results in the adjustment of the window glass 6 to the weather strip 38, as described hereinabove. Such adjustment causes the engaging relationship of the roller 45 and the window glass 6 to be changed. However, the roller 45 may be moved inwardly or outwardly by attaching the pressing device 42 to the oblique side portion 48, thereby ensuring the desirable contact of the roller 45 with the window glass 6 in accordance with the displacement of the glass lower portion. It is possible to secure or adhere a spacer 51 to the glass lower portion so as to ensure the contact of the roller 45 with the window glass 6, as seen in FIG. 5. When the spacer 51 is formed with an inclined plane, the said contact may be more effected.

Figure 6:
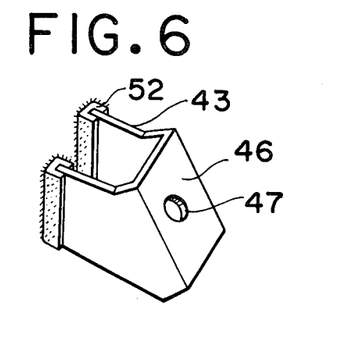
FIG. 6 is a fragmentary perspective view illustrating a further embodiment of the window glass pressing device.
Figure 7:
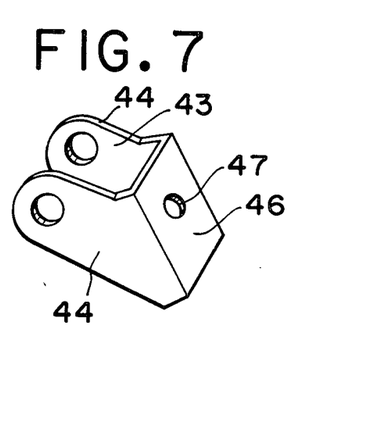
FIG. 7 is a perspective view showing a bracket employed in the window glass pressing device of FIGS. 4 or 5.

In addition, a sealing member 52 made of a plastic material or a hard rubber may be secured in place of the roller 45 to each end of the body 43 so as to engage the member 52 with the window glass 6, as shown in FIG. 6.

Recommendably, the trajectory of the roller 45 or the member 52 may be described along the vertical line from the crossing point of a front edge 53 and an upper edge 54 of the window glass 6. The trace of the window glass 6 between the closed and the opened positions does not conform to the curvature of the vertical section of the guide rod 15 since the window glass 6 is rotatably held by inserting the lower guide follower 11 to the guide rod 15 and the upper guide follower 10 is loosely received by the guide rod 15. That is to say, when the window glass 6 is moved down to the opened position from the closed position for instance, the upper edge of the window glass 6 is urged to move outward due to engagement with the projection 37 of the outer weather strip 36 whilst the lower edge of the window glass 6 is urged to move inward, thus each trace is inconsistent. Similarly, when the window glass 6 is moved up to the closed position from the opened position the trace thereof is along the aforementioned one. Consequently, if the roller 45 is always in contact with the window glass 6 during the vertical movement thereof, the resistance applied onto the roller 45 is varied in accordance with the displacement of the window glass 6. When the window glass 6 is moved to the opened or the closed position from the partially opened position for instance, the engagement of the roller 45 with the window glass 6 avoids the possible deflection of the lower edge of the window glass 6 toward the inside due to the shock. Additionally, when the vehicle is run at a high speed with the window glass closed, the window glass deflection toward the outside due to suction pressure will be also avoided.

It is also to be noted that when the spacer 51 is secured to the lower portion of the window glass 6 in order to engage the roller 45 with the window glass 6 only upon closure thereof as shown in FIG. 5, the window glass deflection toward the outside due to the suction pressure may be prevented at a high speed running of the vehicle by blocking the inward deflection of the lower portion of the window glass. Thus, the objectionable noise and water leakage may be also prevented.

It will be readily seen that the pressing device 42 as illustrated in FIG. 6 will be employed in the same way as the device in FIGS. 4 and 5 to thereby obtain the same effect.

Figure 8:
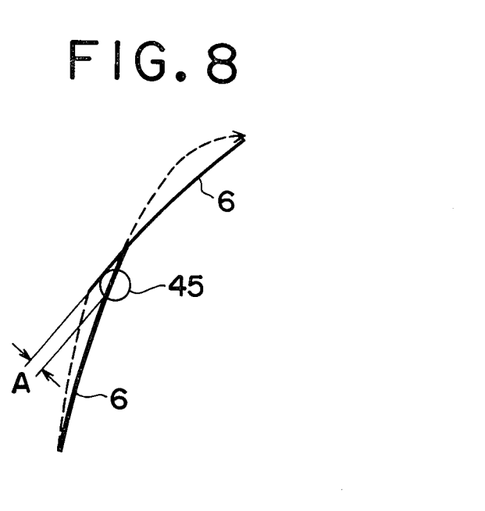
FIG. 8 is a schematic view showing the movement of the window glass.

In FIG. 8, there is schematically shown the movement of the window glass 6. The window glass 6 is moved up from the position indicated by the thick solid line to the position indicated by the thin solid line with a trace indicated by the dotted line. According to the embodiment of FIG. 4 the window glass 6 is at its lower dead point pressed outward by the difference A due to the roller 45 which is always in contact with the window glass 6 during the vertical movement thereof. According to the embodiment of FIG. 5, the spacer 51 of a thickness corresponding to the difference A is secured to the lower portion of the window glass 6, so that the roller 45 may press the lower portion of the window glass 6 outward through the spacer 51 at the upper dead point of the window glass 6. Therefore, the upper portion of the window glass 6 is seated against the weather strip 38. Consequently, the operation of the window glass movement will be lightened or facilitated since the roller 45 is in contact with the window glass 6 only at the upper dead point thereof.

We claim:

1. In an automotive vehicle including panel means which has at least one window opening and a window glass mounted in said panel means for movement substantially in a vertical direction between a closed position wherein the window glass closes the window opening and an open position wherein the window opening is fully opened and weather strips mounted along said window opening on each side of said window glass, the improvement comprising window glass mounting means including window glass support bracket means secured to the window glass, substantially vertically extending guide rail means stationarily disposed in said panel means, guide follower means for slidably connecting said bracket means to said guide rail means and for guiding said window glass along said guide rail means, power means for moving said window glass in the vertical directions, and pressing means secured to a part of said panel means spaced substantially below the weather strips mounted along said window opening to be in continuous frictional contact with only the inside of said window glass and to continuously limit the rotation of a lower part of said window glass toward the inside of said automotive vehicle.

2. A free movement preventing device for window glasses in accordance with claim 1 in which said pressing means includes an engagement element and is slidably attached on an oblique side portion of said panel means whereby an engagement pressure of said engagement element of said pressing means on said window glass may be adjusted.

3. A free movement preventing device for window glasses in accordance with claim 2 in which said window glass is at its lower part provided, with spacer means, and said engagement element is brought into contact with said spacer means and hence said window glass when said window glass is in the closed position, thereby limiting the inward deflection of the lower part of said window glass.

4. A free movement preventing device for window glasses in accordance with claim 2 in which said pressing means is mounted on the part of said panel means along a vertical line measured from the crossing point of a front edge and an upper edge of the window glass.

5. A free movement preventing device for window glasses in accordance with claim 2 in which said engagement element of said pressing means is secured to a body thereof having channel shaped cross-sectional configuration, and a bottom wall of said body is secured to said panel means through an elongated slot provided on said oblique side portion thereof.

6. A free movement preventing device for window glasses in accordance with claim 5 in which said engagement element comprises a roller which is rotatably mounted on said body of said pressing means.

7. A free movement preventing device for window glasses in accordance with claim 5 in which said engagement element comprises strip means secured to said body of said pressing means.

8. A free movement preventing device for window glasses in accordance with claim 5 in which said panel means comprises an outer panel and an inner panel to which said pressing means is attached.

9. In an automotive vehicle including panel means which has at least one window opening and a window glass mounted in said panel means for movement substantially in vertical directions between a closed position wherein the window glass closes the window opening and an open position wherein the window opening is fully opened and weather strips mounted along said window opening on each side of said window glass, the improvement comprising window glass mounting means including window glass support bracket means secured to the window glass, substantially vertically extending guide rail means stationarily disposed in said panel means, guide follower means for slidably connecting said bracket means to said guide rail means and for guiding said window glass along said guide rail means, power means for moving said window glass in the vertical directions, pressing means, including a body portion and a roller, secured to said panel means and spaced substantially below said weather strips to be in continuous contact with only the inside of said window glass and to continuously limit the deflection of a lower part of said window glass toward the inside of said automotive vehicle, said pressing means being slidably attached on an oblique said portion of side panel means so as to adjust an engagement pressure of the roller of said pressing means on said window glass, said roller of said pressing means being rotatably secured to the body portion of said pressing means, said body portion having a channel shaped cross-sectional configuration, and a bottom wall of said body portion being secured to said panel means through an elongated slot provided on said oblique side portion thereof.

10. A free movement preventing device for window glasses in accordance with claim 9 in which said window glass is at its lower part provided with spacer means, and said roller is brought into contact with said spacer means and hence said window glass when said window glass is in the closed position, thereby limiting the inward deflection of the lower part of said window glass.

* * * * *

UNITED STATES PATENT AND TRADEMARK OFFICE
CERTIFICATE OF CORRECTION

PATENT NO. : 4,094,100

DATED : June 13, 1978

INVENTOR(S) : Ryoichi Fukumoto et al

It is certified that error appears in the above—identified patent and that said Letters Patent are hereby corrected as shown below:

Claim 9:

Column 8, line 12, change "said" to --side--, and "side" to --said--.

Signed and Sealed this

Fourteenth Day of November 1978

[SEAL]

Attest:

RUTH C. MASON
Attesting Officer

DONALD W. BANNER
Commissioner of Patents and Trademarks